(12) United States Patent
Yoder (10) Patent No.: US 8,558,706 B1
(45) Date of Patent: Oct. 15, 2013

(54) WIRELESS ALARM INTERCOM SYSTEM

(76) Inventor: Jaime Yoder, Goshen, IN (US)

( * ) Notice: Subject to any disclaimer, the term of this patent is extended or adjusted under 35 U.S.C. 154(b) by 314 days.

(21) Appl. No.: 13/156,084

(22) Filed: Jun. 8, 2011

Related U.S. Application Data (60) Provisional application No. 61/352,640, filed on Jun. 8, 2010.

(51) Int. Cl.
  *G08B 17/00* (2006.01)
(52) U.S. Cl.
  USPC ...................................... 340/584; 340/286.07
(58) Field of Classification Search
  USPC .................. 340/584, 286, 7, 286.05; 174/66
  See application file for complete search history.

(56) References Cited

U.S. PATENT DOCUMENTS

| | | |
|---|---|---|
| 4,550,311 A | 10/1985 | Galloway et al. |
| 4,871,999 A | 10/1989 | Ishii et al. |
| 4,908,604 A | 3/1990 | Jacob |
| 5,889,468 A | 3/1999 | Banga |
| 5,929,762 A | 7/1999 | Missimer, Jr. |
| 6,094,140 A | 7/2000 | Parente |
| 6,727,815 B2 | 4/2004 | Röpke |
| 7,391,319 B1 | 6/2008 | Walker |
| 7,429,921 B2 | 9/2008 | Seeley et al. |
| 2006/0281435 A1* | 12/2006 | Shearer et al. ............. 455/343.1 |

* cited by examiner

*Primary Examiner* — Shirley Lu
(74) *Attorney, Agent, or Firm* — Montgomery Patent & Design; Robert C. Montgomery (57) ABSTRACT

A wireless electronic intercom system with integrated smoke alarm and over-temperature detection capabilities with the capability of providing audio communication between a plurality of systems is herein described. Each system is provided with a smoke detector. The alarm signal is alerted at the detecting system and at other systems connected wirelessly to it. An LCD display on the front of each system will provide information as to which building or area in which smoke has been detected. Additionally, each system is provided with a temperature sensor that can be set to alarm at specific under- and over-temperature limits that are set locally at each system. Other features include a wall mounting bracket, a power supply, a user changeable channel or frequency system, a push-to-talk (PTT) button, and a unit identification placard.

10 Claims, 6 Drawing Sheets

WIRELESS ALARM INTERCOM SYSTEM

RELATED APPLICATIONS

The present invention was first described in and claims the benefit of U.S. Provisional Application No. 61/352,640 filed Jun. 8, 2010, the entire disclosure of which is incorporated herein by reference.

FIELD OF THE INVENTION

The present invention relates generally to a smoke and heat sensing and alarming system, and in particular, to a wireless intercom integrated with a smoke and heat sensing and alarming system.

BACKGROUND OF THE INVENTION

For buildings in both the commercial and private sectors, few things are more important than the safety of the building's inhabitants. Due to the fact that people tend to place a high value on their property and personal safety, the marketplace has responded with a variety of products that are intended to protect both property and the lives of those using it.

Perhaps the most common of these products is the smoke alarm. Such alarms have undoubtedly saved countless lives since their use began. However, such alarms are only effective if there is someone to hear them. Remote buildings on properties such as garages, barns, storage sheds and other similar unoccupied buildings are left unprotected even if equipped with smoke detectors.

Various attempts have been made to provide fire monitoring and alarm systems for remote properties. Examples of these attempts can be seen by reference to several U.S. patents. U.S. Pat. No. 4,550,311, issued in the name of Galloway et al., describes a remote sensing system in which a sensor detecting intrusion, fire, or the like transmits corresponding signals to a master station. The Galloway system further includes an automated unique station identification assignment method.

U.S. Pat. No. 4,871,999, issued in the name of Ishii et al., describes a fire alarm system including a plurality and variety of analog sensors in electrical communication with a single alarm section.

U.S. Pat. No. 5,889,468, issued in the name of Banga, describes a smoke alarm system with a plurality of sensors and transmitters for transmitting an alarm to a central monitoring unithe central monitoring unit is capable of automatically contacting emergency personnel via a telephone line when the alarm is issued. However, none of these designs are similar to the present invention.

While these systems fulfill their respective, particular objectives, each of these references suffer from one (1) or more of the aforementioned disadvantages. Many such systems do not provide a desirable range of sensing capabilities such as those suitable for detecting heating system failure in wintertime. Furthermore, many such systems do not provide useful post-installation customizability or functionality. Also, many such systems do not provide a means for users to receive and transmit information beyond that automatically generated by the system. Accordingly, there exists a need for smoke and heat sensing and alarming system without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for smoke and heat sensing and alarming system further providing features of customizability, functionality, and communication to augment the efficacy of the system. Thus, the object of the present invention is to solve the aforementioned disadvantages and provide for this need.

To achieve the above objectives, it is an object of the present invention to provide a means to sense smoke and heat in a residential or commercial structure and to alarm occupants as well as remote parties of the sensed hazard. The system provides a plurality of wireless intercom apparatuses each integrated with a smoke and heat sensing and alarming means.

Another object of the present invention is to provide wireless two-way radio communication between each of the apparatuses. Each apparatus has an enclosure provided with a pair of antennas and other radio features including a power switch, a push-to-talk button, a channel selector, a volume switch, a microphone, and a speaker.

Yet still another object of the present invention is to facilitate quick and accurate identification of each of the apparatuses during setup and operation by providing each apparatus with a unique identification label. Each apparatus further includes an electronic intercom display providing visual indication of the current operational state of the apparatus including the current communications channel.

Yet still another object of the present invention is to enable simultaneous wireless communication between any number of apparatuses.

Yet still another object of the present invention is to provide both smoke and heat sensors for detecting a range of alarm-triggering conditions. Each apparatus includes a plurality of vents allowing the sensors to receive and test ambient air.

Yet still another object of the present invention is to provide each apparatus with an alarm display showing the local ambient air temperature and associated circuitry for determining whether the temperature is within a pre-programmed alarm range or whether smoke is present. The heat sensing and under-temperature functionality is particularly adapted for detecting failure of heating system in wintertime, which can cause severe damage to a remote facility and anything stored within the facility.

Yet still another object of the present invention is to automatically transmit an alarm signal and associated information to other apparatuses within the system network upon triggering of a smoke alarm or heat alarm, as well as a local alarm alerting nearby individuals to the presence of the alarm condition.

Yet still another object of the present invention is to provide a method of utilizing the device that provides a unique means of acquiring a desired plurality of apparatuses, installing each apparatus at a desired location and ensuring that the vents are exposed, communicating between apparatuses by depressing the push-to-talk button and speaking into the microphone, providing smoke and temperature monitoring, and enhancing safety at the installed locations and for nearby persons.

Further objects and advantages of the present invention will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY 10 intercom with smoke and heat sensing and alarming means
15 enclosure
16 mounting aperture
17 vent
18a front panel
18b rear panel
18c top panel
18d bottom panel
18e side panel
20 power switch
25 first antenna
30 second antenna
35 push-to-talk button
40 channel up/down selector switch
45 volume up/down selector switch
50 microphone
55 speaker
60 alarm alphanumeric display
65 intercom alphanumeric display
70 identification labels
75 power supply
80 intercommunication system
85 transceiver module
90 5-volt regulator
95 microcontroller
100 smoke detector
105 temperature sensor
110 radio module
115 first functional block
120 second functional block
125 third functional block
130 first operational block
135 fourth functional block
140 fifth functional block
145 sixth functional block
150 second operational block
155 seventh functional block
160 eight functional block
165 ninth functional block
170 third operational block
175 tenth functional block
180 MOSFET
185 resistor
190 operational amplifier
195 NAND gate

DETAILED DESCRIPTION OF THE PREFERRED EMBODIMENT

In accordance with the invention, the best mode is presented in terms of a preferred embodiment, herein depicted within FIGS. 1 through 7. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

The present invention describes a wireless intercom with smoke and heat sensing and alarming means (herein described as the "apparatus") 10, which provides a means for sensing smoke or heat in a desired residential or commercial structure and alarming an occupant thereof. The apparatus 10 also provides a two-way radio transceiver for verbal communication between apparatuses 10.

Figure 1:
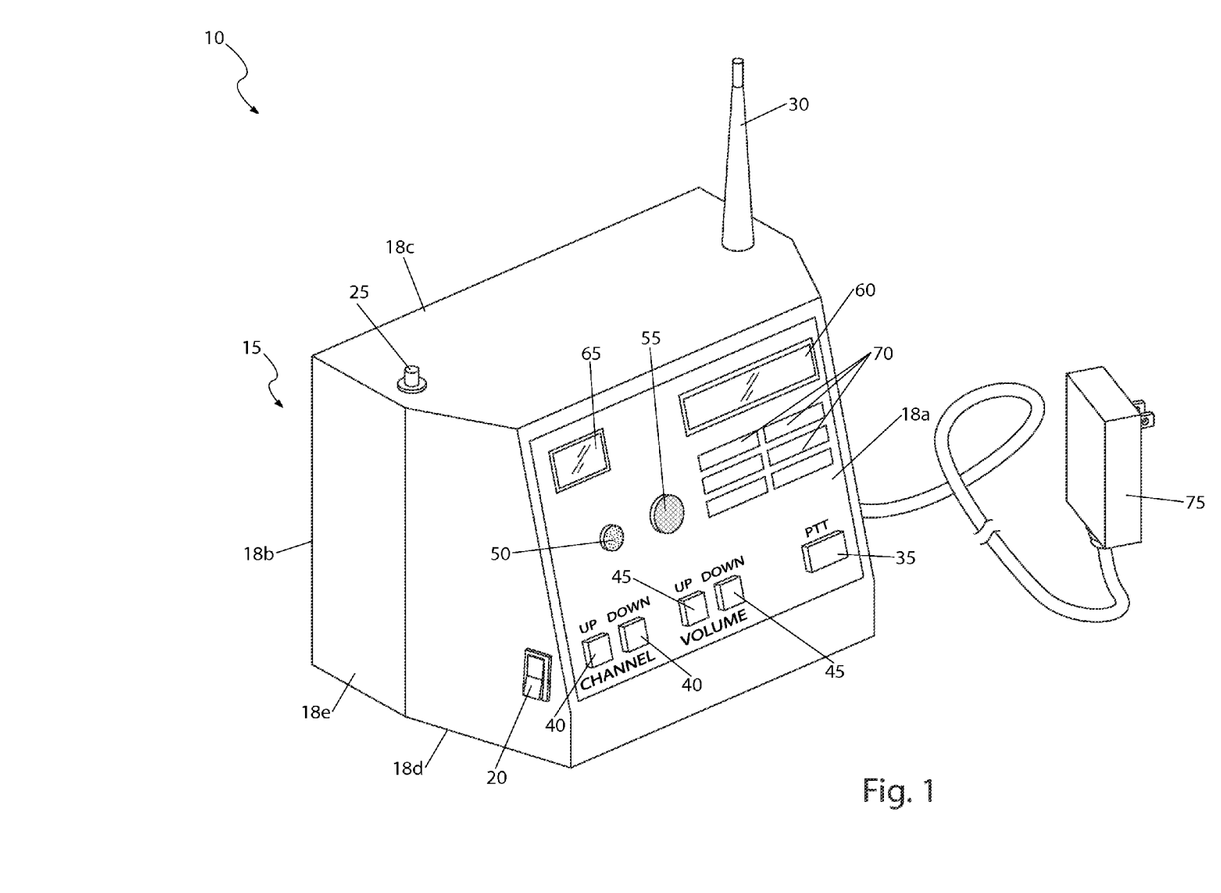
FIG. 1 is a front perspective view of a wireless intercom with smoke and heat sensing and alarming means 10, according to the preferred embodiment of the present invention.
Figure 2:
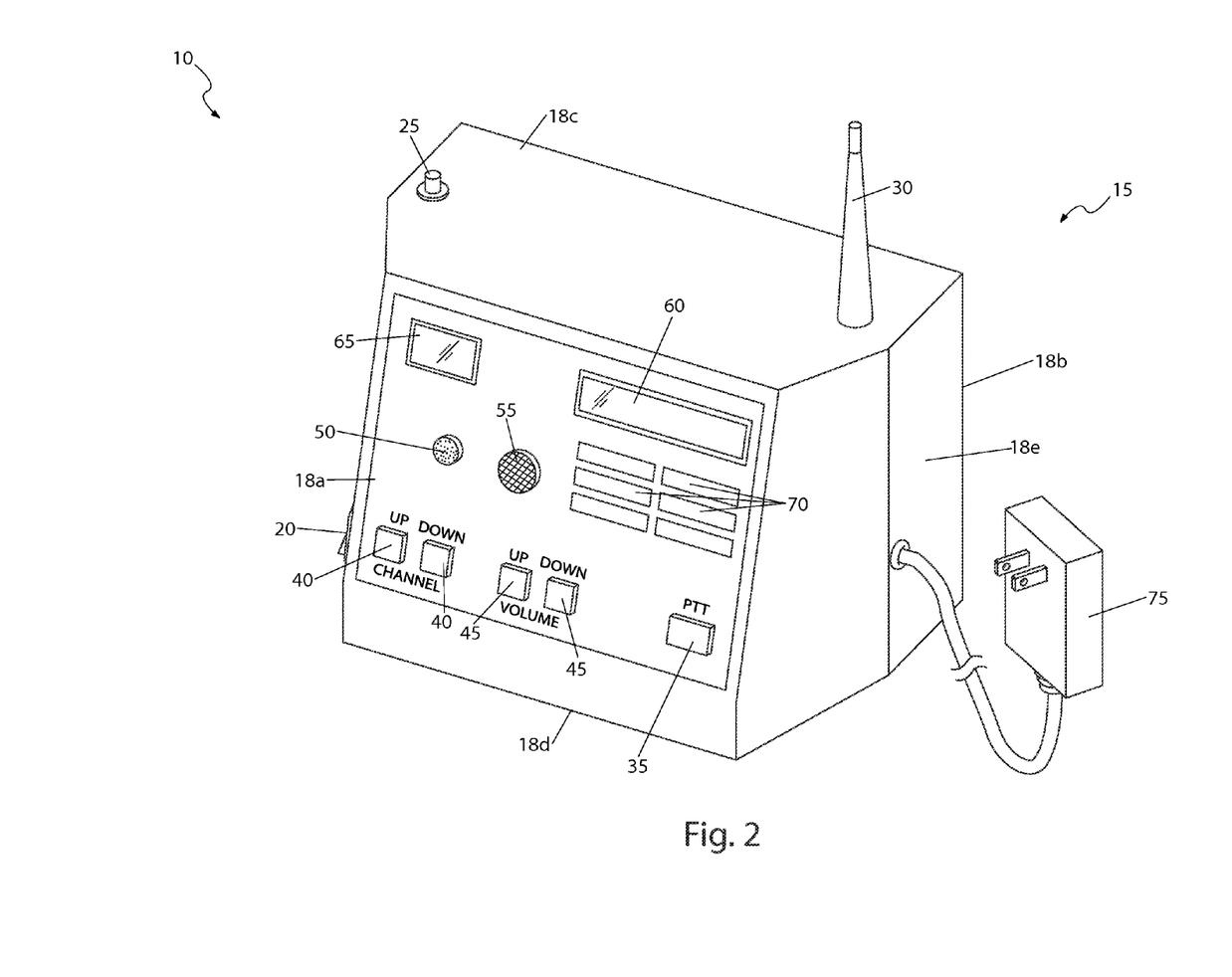
FIG. 2 is an opposing front perspective view of the wireless intercom with smoke and heat sensing and alarming means 10, according to the preferred embodiment of the present invention.
Figure 3:
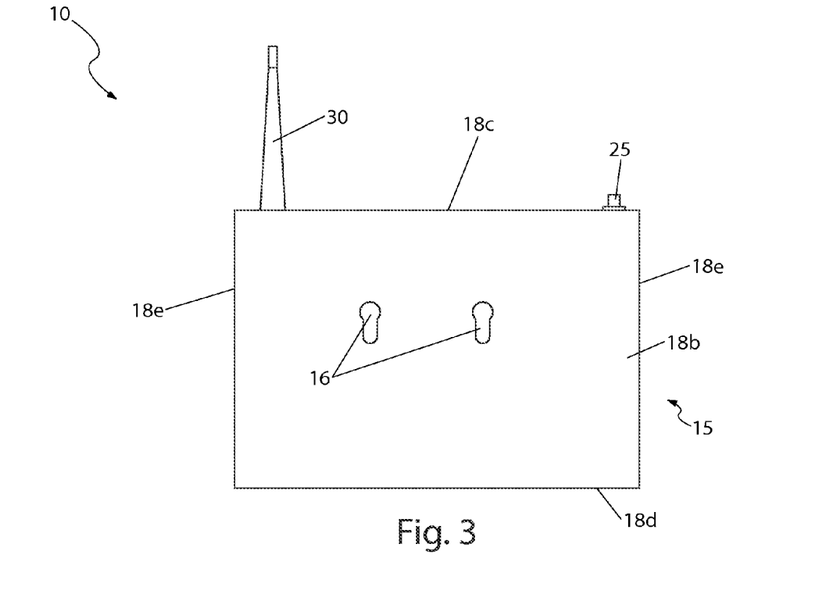
FIG. 3 is a rear view of the wireless intercom with smoke and heat sensing and alarming means 10, according to the preferred embodiment of the present invention.
Figure 4:
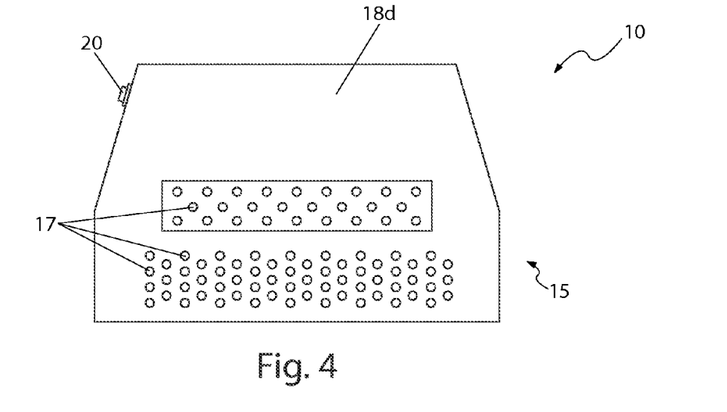
FIG. 4 is a bottom view of the wireless intercom with smoke and heat sensing and alarming means 10, according to the preferred embodiment of the present invention.

Referring now to FIGS. 1 through 4, various views of the apparatus 10, according to the preferred embodiment of the present invention, are disclosed. FIG. 1 depicts a front perspective view of the apparatus 10, FIG. 2 depicts an opposing front perspective view of the apparatus 10, FIG. 3 depicts a rear view of the apparatus 10, and FIG. 4 depicts a bottom view of the apparatus 10. The apparatus 10 comprises a trapezoidal enclosure 15 which houses a plurality of electronic devices. The enclosure 15 is fabricated from materials such as plastic, metal, or the like and measures approximately eight (8) inches in height, ten (10) inches in width, and seven (7) inches in depth. The enclosure 15 may be mounted via a pair of mounting apertures 16 located on a rear panel 18b of the enclosure 15. The mounting apertures 16 utilize existing fasteners such as screws which are inserted into a desired vertical surface such as a wall for insertion and securing within each mounting aperture 16 in a conventional manner. The apparatus 10 is provided with a side-mounted power switch 20 which activates or deactivates the apparatus 10 (also see herein below). A top panel 18c of the enclosure 15 is provided with a first antenna 25 and a second antenna 30 for the purposes of voice intercom capabilities and smoke and heat alarm transmitting capabilities, respectively. A front panel 18a of the enclosure 15 is provided with a push-to-talk button 35, a channel up/down selector switch 40, and a volume up/down selector switch 45 as provided as part of a conventional intercom system. The front panel 18a of the enclosure 15 also provides for a microphone 50 and a speaker 55 for a user to communicate with other apparatuses 10. Also provided upon the front panel 18a is an alarm alphanumeric display 60 and intercom alphanumeric display 65 to allow for user interface with the apparatus 10. A plurality of identification labels 70 is also provided which allows for user identification of the appropriate station location as depicted upon the alarm alphanumeric display 60 or the intercom alphanumeric display 65, during initial setup and operation of the system. The identification labels 70 are preferably cardstock or similar paper which enables a user to write various alphanumeric characters which pertain to other structures which also comprise another apparatus 10. A total quantity of eight (8) identification labels 70 is shown upon the apparatus 10 due to illustrative limitations. However, it should be noted that such a limitation is not intended to be a limiting factor of the present invention. A bottom panel 18d of the enclosure 15 is also provided with a plurality of vents 17 to allow for the entrance and exit of ambient air. The air is sensed for the presence of smoke or excess heat by internal components to be described in greater detail herein below.

Figure 5:
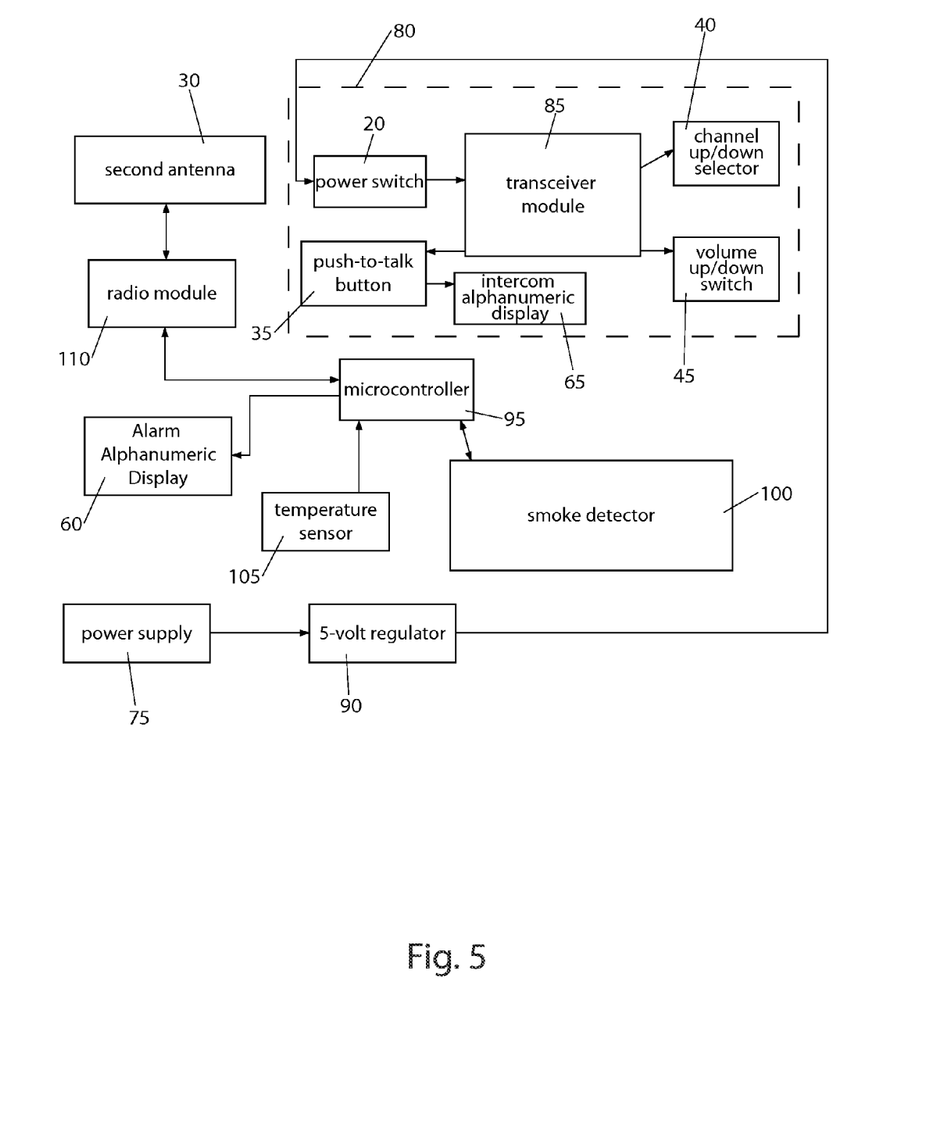
FIG. 5 is a block diagram depicting the major electrical component groupings of the wireless intercom with smoke and heat sensing and alarming means 10, according to the preferred embodiment of the present invention.

Referring next to FIG. 5, a basic block diagram of the apparatus 10, depicting the major component groupings of electrical devices, according to the preferred embodiment of the present invention, is disclosed. Internally within the enclosure 15, an intercommunication system 80 is provided which interconnects and controls the devices upon the front panel 18a of the enclosure 15. The intercommunication system 80 allows for voice communication between various or multiple apparatuses 10. The intercommunication system 80 is comprised of electrical components and systems that are well known in the art and operate on authorized wireless frequencies in a licensed and controlled manner. The intercommunication system 80 consists of a transceiver module 85 which receives inputs from the push-to-talk button 35, the channel up/down selector switch 40, and the volume up/down selector switch 45. When the push-to-talk button 35 is depressed an indication to the user that the transceiver module 85 is working properly will display upon the intercom alphanumeric display 60. The intercom alphanumeric display 60 is located upon the front panel 18a and is preferably a liquid crystal display (LCD), yet other displaying means may be utilized without limiting the scope of the apparatus 10. The push-to-talk button 35, the channel up/down selector switch 40, and the volume up/down selector switch 45 are comprised of common pushbutton electronic devices, yet other switching devices may be utilized without limiting the scope of the apparatus 10.

Power is derived from the power supply 75 which is inserted into a common household outlet (see FIG. 1) and also energizes a 5-volt regulator 90. Power is received from the power supply 75 and to the power switch 20. The power switch 20 activates and deactivates the operation of the apparatus 10. The power switch 20 is depicted as a common rocker switch, yet other switching devices may be utilized without limiting the scope of the apparatus 10. The transceiver module 85 comprises the first antenna 25, the microphone 50, and the speaker 55 as associated but external components. The microphone 50 is a common acoustic-to-electric sensor which transmits the user's verbal command to another apparatus 10. The speaker 55 is a common electromechanical transducer which amplifies an audible warning for the user(s) or the verbal command initiated by another apparatus 10.

Power from the 5-volt regulator 90 is then routed to a microcontroller 95. Inputs to the microcontroller 95 include a smoke detector 100 and a temperature sensor 105 such as a thermal sensor. The smoke detector 100 contains its own internal local audible alarm as well as associated detection chambers which are common to existing dual sensor detectors. Outputs from the microcontroller 95 include a radio module 110 which works with the second antenna 30 and the alarm alphanumeric display 60. Information relayed by the alarm alphanumeric display 60 preferably includes information such as, but is not limited to: current temperature, high alarm set point, low alarm set point, alarm conditions, and associated related information. In addition to displaying information from the local apparatus 10, the alarm alphanumeric display 60 would also display information from other apparatuses 10 as part of a local communication network to inform other users about the conditions being observed within other rooms or structures. The alphanumeric display 60 is preferably comprised of a common liquid crystal display (LCD), yet other displaying methods may be utilized without limiting the scope of the apparatus 10.

Figure 6:
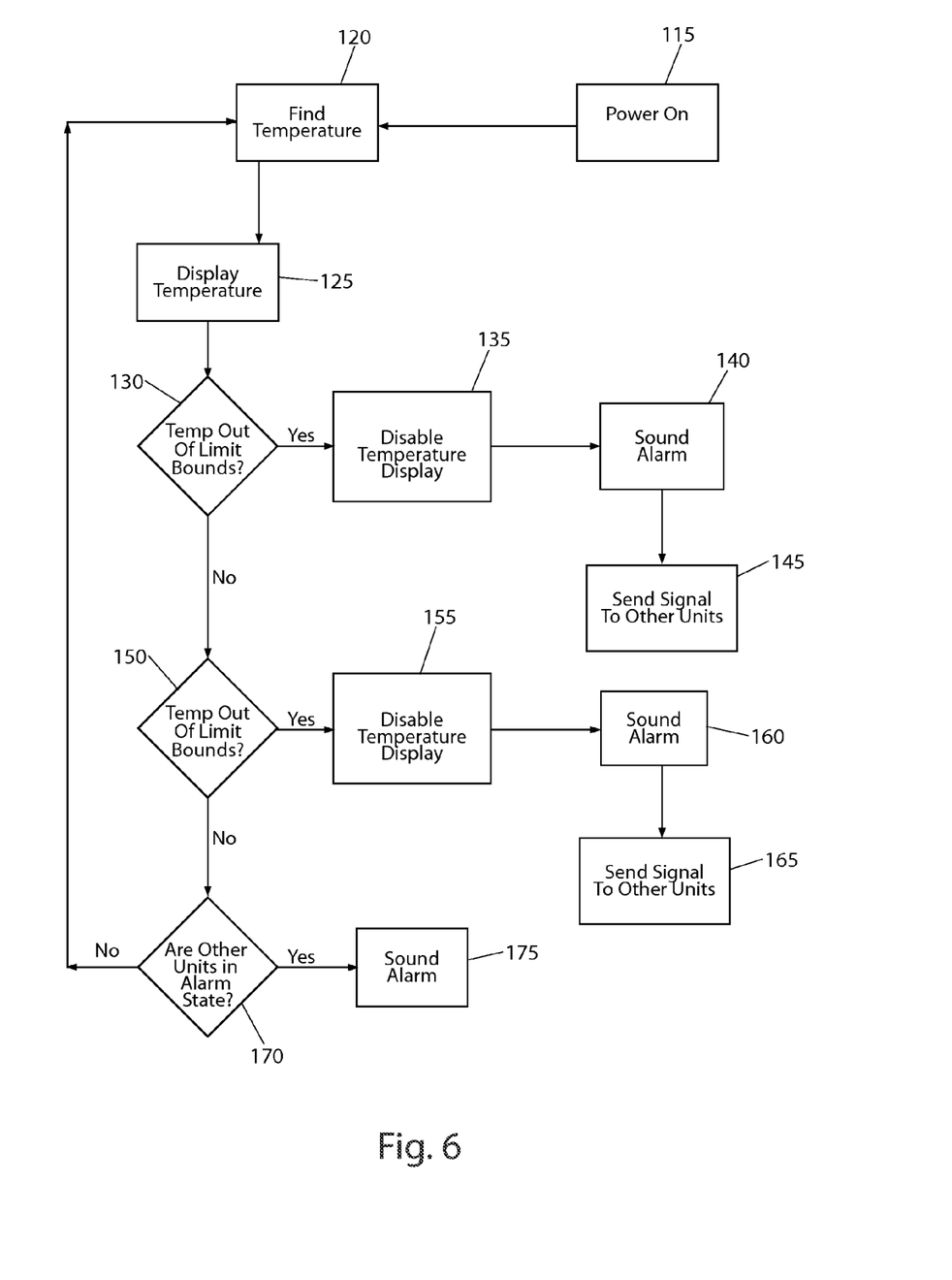
FIG. 6 is a flow chart depicting the operational sequence of the wireless intercom with smoke and heat sensing and alarming means 10, according to the preferred embodiment of the present invention; and, FIG. 7 is an electrical schematic diagram depicting the major electronic components as used in the wireless intercom with smoke and heat sensing and alarming means 10, according to the preferred embodiment of the present invention.

Referring now to FIG. 6, a flow chart depicting the operational sequence of the apparatus 10, according to the preferred embodiment of the present invention, is disclosed. The sequence provides teachings regarding the alarm operation of the microcontroller 95 and is not intended to provide overall unit operation of the apparatus 10. Alarm sequence begins at a first functional block 115 where power is applied via the power supply 75. Control then continues to a second functional block 120 and a third functional block 125 sequentially, which determines and then displays the ambient room temperature, respectively via the temperature sensor 105. Such temperature readings are intended to be local at the apparatus 10 only. Sequence then continues to a first operational block 130 which determines if the temperature is out of pre-programmed restraint bounds. In the event of a positive response, control then flows to a fourth functional block 135, a fifth functional block 140 and a sixth functional block 145 which disables the display of the local temperature as depicted on the alarm alphanumeric display 60, sounds the alarm, and then sends the resultant alarm signal and associated information to other apparatuses 10 contained within the network. In the event of a negative response, control then progresses to a second operational block 150 which senses for the presence of smoke via the smoke detector 100. In the event of a positive response, control then flows to a seventh functional block 155, a eight functional block 160 and a ninth functional block 165 which disables the display of the local temperature as depicted on the alarm alphanumeric display 60, sounds the alarm, and then sends the resultant alarm signal and associated information to other apparatuses 10 contained within the network via the microcontrollers 95 radio module 110 and the second antenna 30. In the event of a negative response, the microcontroller 95 then checks for the presence of other apparatuses 10 in the network in alarm mode in a third operational block 170 via the transceiver module 85. Should a positive outcome be realized, a local alarm is sounded by a tenth functional block 175 to alert nearby individuals to the presence of an alarm condition. Should a negative outcome be realized, operation returns to the second functional block 120 in a sequential manner.

Figure 7:
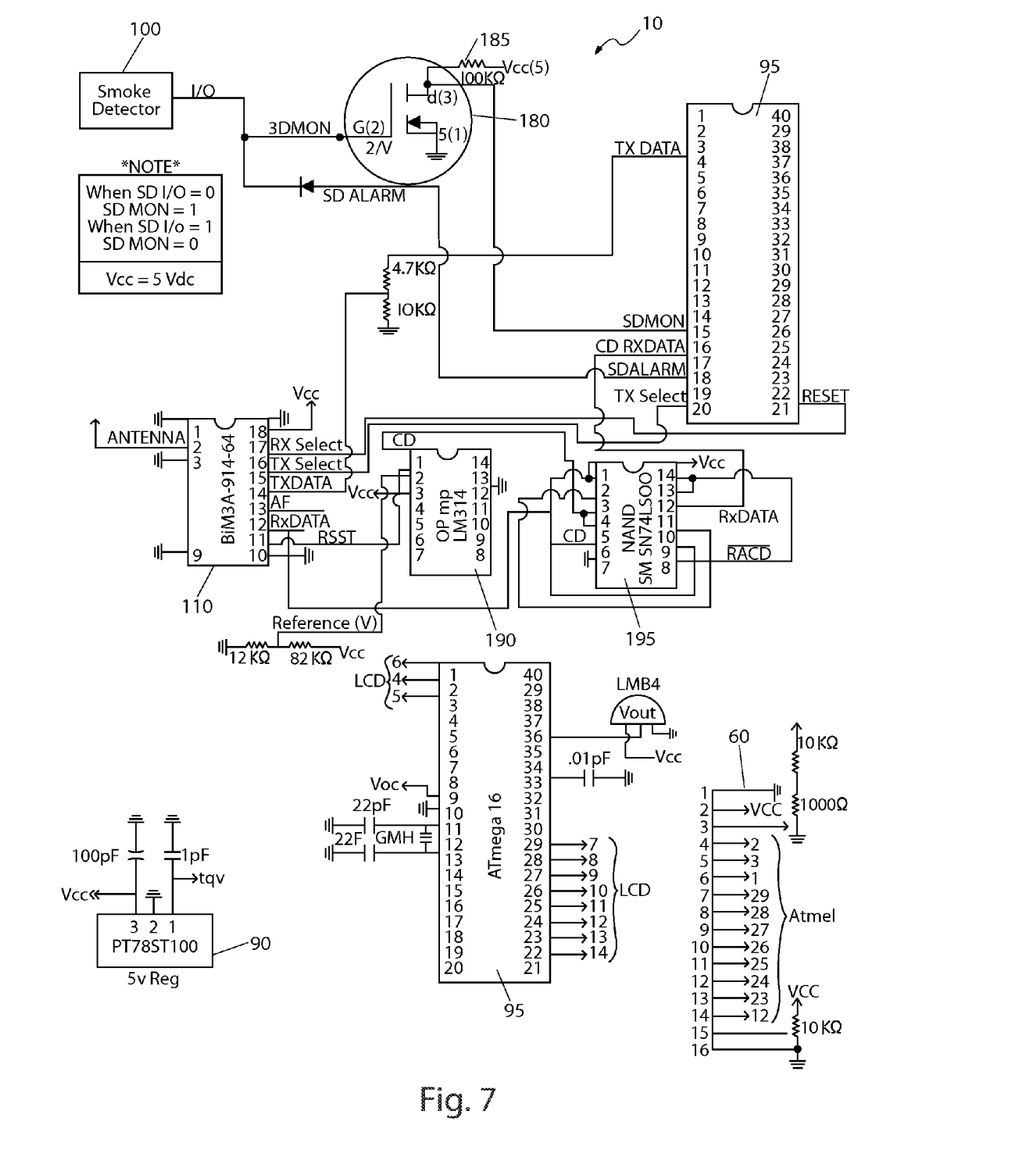

Referring finally, to FIG. 7, an electrical schematic diagram depicting the major electronic components as used in the apparatus 10, according to the preferred embodiment of the present invention, is disclosed. The digital output of the smoke detector 100 is routed through preferably an N-Channel MOSFET 180 which is used to assist the microcontroller 95 in monitoring the active state. When the smoke detector 100 alarms, the voltage at the output pin is between 8V to 9V. This voltage is too high for the microcontroller 95 which can only handle voltages between 0V to 5V. Therefore, the gate of the microcontroller 95 is connected to the gate of the MOSFET 180 to trigger it on, yet keep the high voltage separated from the microcontroller 95. Once the smoke detector 100 alarms, the voltage gates the MOSFET 180 and turns it on. The drain is connected to the 5-volt regulator 90. When the MOSFET 180 is off the 5V is registered as a digital one (1) at the microcontroller 95. When the MOSFET 180 turns on, a resistor 185 is connected to ground through the MOSFET 180 and the entire 5V is dropped across the resistor 185 leaving the microcontroller 95 to register a digital zero (0).

The radio module 110 is a 914 MHz high speed FM radio Transceiver module which is purchased from companies such as RADIOMETRIX© or equivalent manufactures. It will transmit and receive data preferably up to sixty-four kilobits per second (64 kbps). It is a crystal controlled Phase Locked Loop (PLL) Frequency Modulated (FM) circuitry for both transmitting and receiving. It has low power requirements able to run off of 2.7V to 6V DC, and typically uses only eight milliamps (8 mA) for transmit mode and one milliamp (1 mA) for receive mode. It is a half duplex transceiver which allows for bidirectional data transfer. Due to the way the radio module 110 is designed, it allows for white noise to be present at the input for the transmitted data. In order to correct the problem, an operational amplifier 190 was used to provide a reference voltage of 0.6V. This provides the adverse reaction of creating a negative input voltage. To address this situation, it must be inverted by a NAND gate 195, thus producing a positive signal for the microcontroller 95 input as shown. The microcontroller 95 is being used as a control unit in addition to driving the alarm alphanumeric display 60 (note that the microcontroller 95 is depicted twice within FIG. 7 for illustrative simplicity). It is used primarily to monitor the smoke detector 100. If activated, the microcontroller 95 will control the radio module 110 to transmit a signal to alert other apparatuses 10 to enter alarm mode as well. Additionally, the microcontroller 95 monitors and displays the current room temperature. If the room temperature goes above or below preset limits, it will send a signal to the smoke detector 100 to alarm, and it will also command the radio module 110 to send a signal to the other apparatuses 10 to notify them of an alarm condition.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing the apparatus 10 may be achieved by performing the following steps: acquiring the apparatus 10; installing fasteners into a desired vertical surface and engaging the fasteners with each mounting aperture 16 upon the rear panel 18*b* of the enclosure 15; ensuring that the vents 17 upon the bottom panel 18*d* of the enclosure 15 are exposed; inserting the power supply 75 into a desired household circuit; and, utilizing the apparatus 10 as described herein below to provide for audio communication over large local distances and temperature monitoring to ensure safety of people and structures.

The method of utilizing the apparatus 10 may be achieved by performing the following steps: ensuring that all apparatuses 10 are plugged in via the power supply 75 and activated by the power switch 20 which enables the intercom channel number to appear in the intercom alphanumeric display 65; communicating with other apparatuses 10 via depressing the push the push-to-talk button 35 and speaking into the microphone 50; enabling an indication of transmission to appear in the intercom alphanumeric display 65 when the apparatus 10 is in working order; releasing the push-to-talk button 35 when finished talking to ensure that all apparatuses 10 are able to communicate with each other; depressing the channel up/down selector switch 40 to change to a desired channel; adjusting listening volume via depressing the volume up/down selector switch 45; and, enabling the temperature and air to be read through the vents 17 on the bottom panel 18*d* of the enclosure 15 and into the smoke detector 100 and temperature sensor 105 for proper functioning.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. An alarm system comprising a plurality of intercom apparatuses, each comprising:
    a resilient enclosure, comprising a pair of side walls, a top wall, a bottom wall, a front wall, and a rear wall;
    a mounting means for mounting said enclosure to a support surface;
    a power switch located on an exterior wall of said enclosure in electrical communication with an external power source;
    a voice intercom means in electrical communication with said power switch and located within said enclosure;
    a smoke and heat detection means in electrical communication with said power switch and located within said enclosure; and,
    a plurality of indication labels removably located on a front wall of said enclosure; wherein said voice intercom means and said smoke and heat detection means of an individual intercom apparatus is in wireless communication with the remaining intercom apparatuses within said system;
    wherein a first voice intercom signal and a first smoke and heat detection signal generated by said individual intercom apparatus is simultaneously transmitted to said remaining intercom apparatuses within said system;
    wherein a second voice intercom signal and a second smoke and heat detection signal generated by any of said remaining intercom apparatuses within said system is transmitted to said individual intercom apparatus,
    wherein each of said plurality of indication labels are used to indicate a specific one of said plurality of intercom apparatuses;
    wherein said voice intercom means further comprises: a push-to-talk button located on said front wall of said enclosure and in electrical communication with said power switch; a transceiver module in electrical communication with said push-to-talk button; a first antenna located on said upper wall of said enclosure and in electrical communication with said transceiver module; a microphone located on said front wall of said enclosure and in electrical communication with said transceiver module; a speaker located on said front wall of said enclosure and in electrical communication with said transceiver module; a channel selector switch located on said front wall of said enclosure and in electrical communication with said transceiver module; a volume selector switch located on said front wall of said enclosure and in electrical communication with said transceiver module; and, an intercom display located on said front wall of said enclosure and in electrical communication with said transceiver module; wherein an indicated value of said channel selector switch corresponds with an indicated value of one of said plurality of intercom apparatuses and with one of said plurality of indication labels; wherein said channel selector switch enables communication with a selected one of said plurality of intercom apparatuses;

wherein a selected channel is displayed on said intercom display when said push-to-talk button is activated; wherein a voice input is directed into said microphone and converted into said first voice intercom signal; wherein said transceiver module transmits said first voice intercom signal via said first antenna;

wherein receipt of said second voice intercom signal is received by said first antenna and said transceiver module, converted into an audible sound, and transmitted through said speaker; and, wherein said volume selector switch selectably increases or decreases a volume transmitted through said speaker.

2. The system of claim 1, wherein said enclosure further comprises a generally trapezoidal body measuring approximately eight inches in height, ten inches in width, and seven inches in depth, a plurality of vents located along said bottom wall, and a pair of mounting apertures located on said rear wall;

wherein ambient air entering said plurality of vents is monitored via said smoke and heat detection means; and, wherein each of said pair of mounting apertures receive a fastener for mounting said enclosure to said support surface.

3. The system of claim 1, wherein each of said plurality of intercom apparatuses further comprises a power cord with a 5-volt regulator.

4. The system of claim 1, wherein said voice intercom means further comprises:
a push-to-talk button located on said front wall of said enclosure and in electrical communication with said power switch;
a transceiver module in electrical communication with said push-to-talk button;
a first antenna located on said upper wall of said enclosure and in electrical communication with said transceiver module;
a microphone located on said front wall of said enclosure and in electrical communication with said transceiver module;
a speaker located on said front wall of said enclosure and in electrical communication with said transceiver module;
a channel selector switch located on said front wall of said enclosure and in electrical communication with said transceiver module;
a volume selector switch located on said front wall of said enclosure and in electrical communication with said transceiver module; and,
an intercom display located on said front wall of said enclosure and in electrical communication with said transceiver module;

wherein an indicated value of said channel selector switch corresponds with an indicated value of one of said plurality of intercom apparatuses and with one of said plurality of indication labels;

wherein said channel selector switch enables communication with a selected one of said plurality of intercom apparatuses;

wherein a selected channel is displayed on said intercom display when said push-to-talk button is activated;

wherein a voice input is directed into said microphone and converted into said first voice intercom signal;

wherein said transceiver module transmits said first voice intercom signal via said first antenna;

wherein receipt of said second voice intercom signal is received by said first antenna and said transceiver module, converted into an audible sound, and transmitted through said speaker; and, wherein said volume selector switch selectably increases or decreases a volume transmitted through said speaker.

5. The system of claim 1, wherein said smoke and heat detection means further comprises:
a microcontroller in electrical communication with said power switch;
a smoke detector housed within said enclosure and in electrical communication with said microcontroller;
a temperature sensor housed within said enclosure and in electrical communication with said microcontroller;
a radio module housed within said enclosure and in electrical communication with said microcontroller;
a second antenna located on said upper wall of said enclosure and in electrical communication with said radio module;
an alarm display located on said front wall of said enclosure and in electrical communication with said microcontroller;
wherein said temperature sensor senses a temperature of ambient air;
wherein said smoke detector senses smoke of ambient air;
wherein said first smoke and heat detection signal is generated by said radio module upon either a sensed temperature value greater than a pre-set over-limit temperature value or a sensed amount of smoke;
wherein said radio module transmits said first smoke and heat detection signal via said second antenna;
wherein said alarm display displays said sensed temperature value, said pre-set over-limit temperature value of said individual intercom apparatus.

6. The system of claim 5, wherein said smoke detector further comprises a dual sensor detector capable of emitting an internal local audible alarm.

7. The system of claim 5, wherein said alarm display further displays said sensed temperature value and said pre-set over-limit temperature value of said remaining intercom apparatuses upon receipt of said second smoke and heat detection signal.

8. The system of claim 5, wherein said smoke detector is further in electrical communication with an N-channel MOSFET device prior to said microcontroller.

9. The system of claim 5, wherein said radio module further comprises a 914 MHz high speed FM radio half duplex transceiver module.

10. The system of claim 9, wherein said radio module further comprises an amplifier and a NAND gate.

* * * * *